(12) United States Patent
Mills et al.

(10) Patent No.: US 6,906,646 B1
(45) Date of Patent: Jun. 14, 2005

(54) METHODS AND DEVICES FOR BINARY OBJECT SERIALIZATION

(75) Inventors: William L. Mills, Yacolt, WA (US); Alvin Pivowar, Carnas, WA (US)

(73) Assignee: PalmSource, Inc., Sunnyvale, CA (US)

( * ) Notice: Subject to any disclaimer, the term of this patent is extended or adjusted under 35 U.S.C. 154(b) by 0 days.

(21) Appl. No.: 10/802,895

(22) Filed: Mar. 16, 2004

(51) Int. Cl.$^7$ .............................................. H03M 9/00
(52) U.S. Cl. ..................................... 341/101; 341/100
(58) Field of Search .............................. 341/100, 101; 360/35.1, 32, 33.1; 358/342, 335, 11, 903; 364/200, 900

(56) References Cited

U.S. PATENT DOCUMENTS 4,647,986 A  *  3/1987  Vaughn et al. ................ 386/91
4,875,189 A  * 10/1989  Obara ................... 365/189.04
6,366,223 B1 *  4/2002  Lee et al. ..................... 341/51

* cited by examiner

*Primary Examiner*—Brian Young
(74) *Attorney, Agent, or Firm*—Berry & Associates P.C.

(57) ABSTRACT

Methods and devices for data serialization are described. Numbers are each encoded as one or more four-bit nibbles. Three bits of a nibble are for encoding some portion of a number and one bit of the nibble is for indicating whether encoding of the number is continued to another nibble. A begin command and an end command are used to bracket and thereby group selected nibbles. The numbers and the commands are serialized in a stream. An interpreter of the stream reads the numbers into data fields of a data object starting at the begin command. The interpreter automatically skips to the end command when the data fields are filled. As such, a newer version of an interpreter can read data serialized using an older version of an encoder, and an older version of an interpreter can read data serialized using a newer version of an encoder.

26 Claims, 4 Drawing Sheets

METHODS AND DEVICES FOR BINARY OBJECT SERIALIZATION

BACKGROUND OF THE INVENTION

1. Field of the Invention

The present invention relates generally to data streaming. Specifically, embodiments of the present invention relate to methods and devices for serializing data and for interpreting serialized data.

2. Related Art

Data maintained on computer systems in databases and data sets is frequently embodied as a data object. A data object can include a number of discrete Instances or fields of information. For example, a data object for an address book application might include a name field, an address field, and a phone number field.

It is often desirable to transfer the information in a data set from one node or device to another. To accomplish this, the information is converted or encoded into a serialized form consisting of a series of bit values that can be transmitted to another device. An interpreter at the receiving device unserializes the data in the stream and translates the data back into data objects. Techniques for data serialization and for interpreting serialized data are known in the art.

A problem can occur when, for example, information that is serialized using a newer version of a data serializer is received at a node that uses an older version of an interpreter. Typically, older versions of software cannot read information generated using newer versions. Information that can be read may not be read properly, or may not be correctly understood.

Also, consider an example in which data objects on an originating device contain a certain number of fields, but the data objects on a receiving device are set up for a lesser number of fields. Even if the interpreter can read the serialized data sent from the originating device, the interpreter will not know how to handle the additional fields of information.

SUMMARY OF THE INVENTION

Accordingly, a method and/or device for serializing data that allows for compatibility of older versions of interpreters with newer versions of serializers (and vice versa) would be valuable. A method and/or device that can accomplish this and that can also handle situations in which the streamed data encompasses more information than the interpreter is expecting would also be valuable. The present invention provides a novel solution to these needs.

Embodiments of the present invention pertain to methods and devices for data serialization and for interpretation of serialized data. In one embodiment, numbers are each encoded as one or more four-bit nibbles. Three bits of a nibble are for encoding some portion of a number and one bit of the nibble is for indicating whether encoding of the number is continued to another nibble. A begin command and an end command are used to bracket and thereby group selected nibbles. The numbers and the commands are serialized in a stream. During deserialization of the serialized data, an interpreter reads the numbers into data fields of a data object starting at the begin command. The interpreter automatically skips to the end command when the data fields are filled. In this manner, situations in which the streamed data encompasses more information than the interpreter is expecting are handled. As such, a newer version of an interpreter can read data serialized using an older version of an encoder, and an older version of an interpreter can read data serialized using a newer version of an encoder.

In one embodiment, a command is marked with (e.g., preceded by) a sentinel value. In one such embodiment, the sentinel value is zero. To distinguish a number zero from the sentinel value, each number to be encoded is incremented by a prescribed amount (e.g., by one) prior to encoding.

In another embodiment, on the first occurrence of a data object, a reference number is associated with the object. Each subsequent occurrence of the object in the stream can then use the reference number. In one such embodiment, the reference number is distinguished as such by observing the number of occurrences in the stream of the begin and end commands. For example, if actual data for the data object is included in the stream, then the data is preceded by a single begin command. If the reference number is used instead of the actual data, then two begin commands are used. Begin and end commands can be nested, so in the example, a reference number is used when the count is even and actual data is used when the count is odd.

In yet another embodiment, the stream further comprises instructions associated with constructing the object from the numbers in the serialized stream. In one such embodiment, a reference number is associated with the instructions, wherein a subsequent occurrence of the instructions in the stream uses the reference number.

In summary, embodiments of the present invention allow forward and backward versioning of both the data serializer and the interpreter. Objects can be separated into data and instructions for constructing the object from the data. Previously defined or constructed objects can be represented using a reference number. Instructions can also be referenced. Accordingly, repetition of information in the serialized data stream can be reduced or eliminated. These and other objects and advantages of the present invention will be recognized by one skilled in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a selfconsistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding" or "using" or "serializing" or "indicating" or "associating" or "observing" or "entering" or "reading" or "decoding" or "skipping" or "distinguishing" or the like, refer to the actions and processes of a computer system (e.g., flowcharts 300 and 400 of FIGS. 3 and 4), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
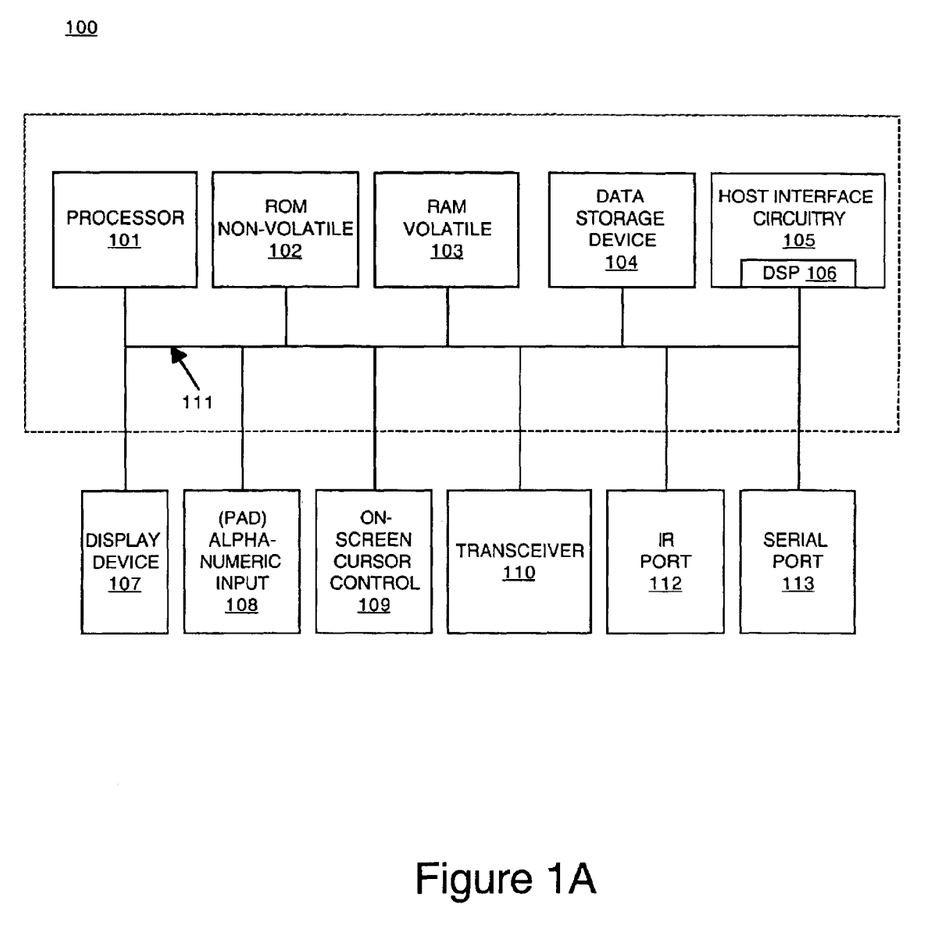
FIG. 1A is a block diagram of an exemplary hand-held computer system upon which embodiments of the present invention may be practiced.

FIG. 1A is a block diagram of one embodiment of a device 100 upon which embodiments of the present invention may be implemented. In one embodiment, device 100 is a handheld computer system often referred to as a personal digital assistant (PDA) or a portable information device (PID). In its various implementations, device 100 may not include all of the elements illustrated by FIG. 1A, or device 100 may include other elements not described by FIG. 1A.

In one embodiment, device 100 includes an address/data bus 111 for communicating Information, a central processor 101 coupled with the bus 111 for processing information and instructions, a volatile memory 103 (e.g., random access memory, RAM) coupled with the bus 111 for storing information and instructions for the central processor 101, and a non-volatile memory 102 (e.g., read only memory, ROM) coupled with the bus 111 for storing static information and instructions for the processor 101. In the present embodiment, device 100 also includes an optional data storage device 104 (e.g., a Secure Digital card, a Multi Media Card, or the like) coupled with the bus 111 for storing information and instructions. Device 104 can be removable. In one embodiment, device 100 also contains a display device 107 coupled to the bus 111 for displaying information to a user.

In the present embodiment, device 100 also includes a signal transmitter/receiver (transceiver) device 110, which is coupled to bus 111 for providing a wireless radio (RF) communication link between device 100 and other wireless devices. Transceiver 110 may be coupled to device 100 or integral with device 100.

In one embodiment, device 100 includes host interface circuitry 105 coupled to bus 111. Host interface circuitry 105 includes an optional digital signal processor (DSP) 106 for processing data to be transmitted or data that are received via transceiver 110. Alternatively, processor 101 can perform some or all of the functions performed by DSP 106. In one embodiment, host interface circuitry 105 comprises a universal asynchronous receiver-transmitter (UART) module that provides the receiving and transmitting circuits utilized for serial communication for both the infrared port 112 and the serial port 113.

In one embodiment, device 100 also includes an optional alphanumeric input device 108 that, in one implementation, is a handwriting recognition pad ("digitizer"). Alphanumeric input device 108 can communicate information and command selections to processor 101 via bus 111. In one embodiment, device 100 also includes an optional cursor control or directing device (on-screen cursor control 109) coupled to bus 111 for communicating user input information and command selections to processor 101. In one implementation, on-screen cursor control device 109 is a touch screen device incorporated with display device 107.

Figure 1B:
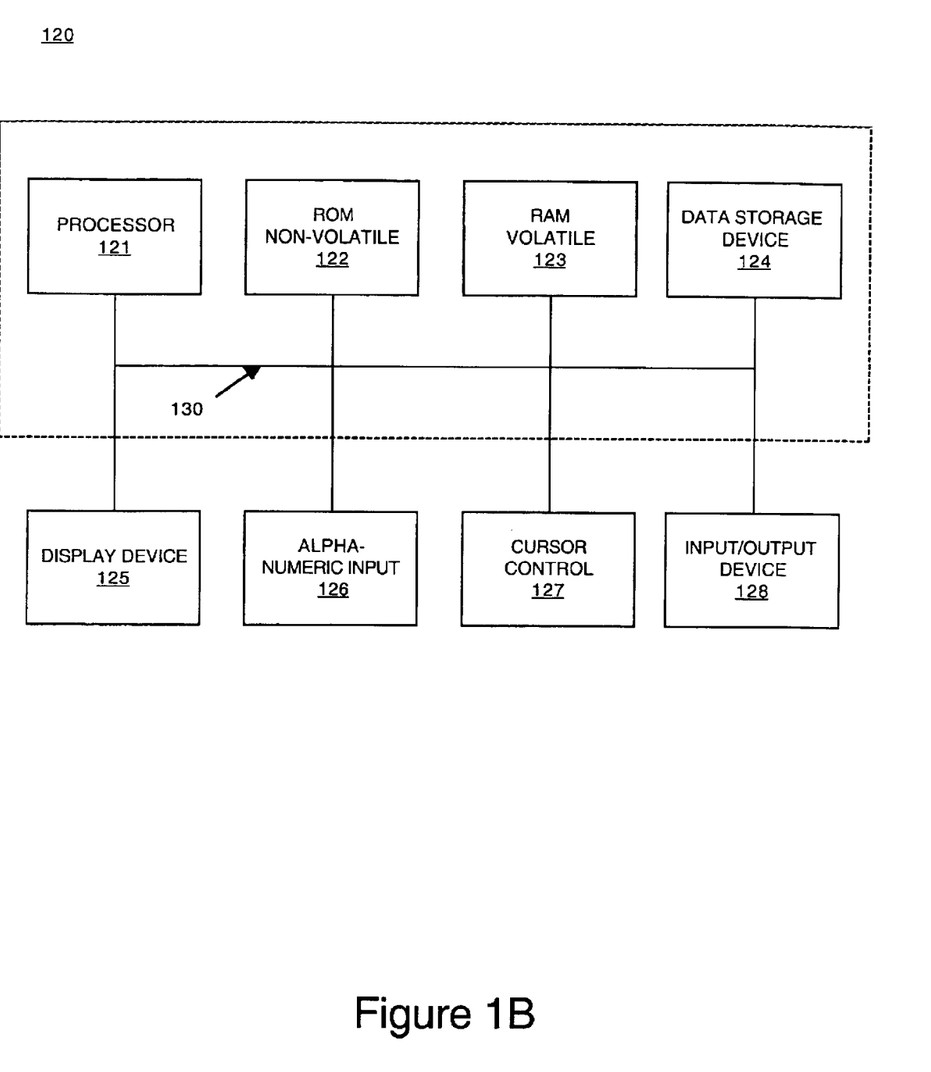
FIG. 1B is a block diagram of an exemplary desktop computer system upon which embodiments of the present invention may be practiced.

Refer now to FIG. 1B that illustrates an exemplary computer system 120 upon which embodiments of the present invention may be practiced. In its various implementations, device 120 may not include all of the elements illustrated by FIG. 1B, or device 120 may include other elements not described by FIG. 1B.

In general, computer system 120 comprises bus 130 for communicating information, processor 121 coupled with bus 130 for processing information and instructions, RAM 123 coupled with bus 130 for storing information and instructions for processor 121, ROM 122 coupled with bus 130 for storing static information and instructions for processor 121, data storage device 124 such as a magnetic or optical disk and disk drive coupled with bus 130 for storing information and instructions, an optional user output device such as display device 125 coupled to bus 130 for displaying information to the computer user, an optional user input device such as alphanumeric input device 126 including alphanumeric and function keys coupled to bus 130 for communicating information and command selections to processor 121, and an optional user input device such as cursor control device 127 coupled to bus 130 for communicating user input information and command selections to processor 121. Furthermore, input/output (I/O) device 128 is used to communicatively couple computer system 120 to another device (e.g., device 100 of FIG. 1A). I/O device 128 may be a device used for wired communication or for wireless communication.

Figure 2:
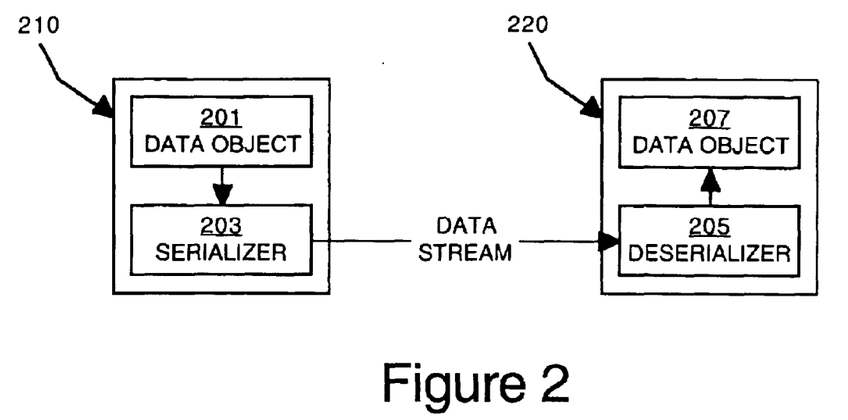
FIG. 2 is a block diagram a data serializer and an interpreter in communication according to one embodiment of the present invention.

FIG. 2 is a block diagram showing two nodes 210 and 220 in communication according to one embodiment of the present invention. There may be nodes between the nodes 210 and 220, such that communication between the two nodes takes place through one or more other nodes. The nodes 210 and 220 may use a wired or a wireless connection or a combination thereof. The node 210 and the node 220 can each be exemplified as either device 100 (FIG. 1A) or device 120 (FIG. 1B).

In FIG. 2, node 210 includes a serializer 203 (which also may be referred to as an encoder) that acts on a data object

201. The serialized data object is then communicated to node 220, which includes a deserializer 205 (which may also be referred to as an interpreter or decoder) that acts on the serialized data object to construct data object 207 (which may be, in essence, a duplicate of data object 201). Node 210 can also incorporate a deserializer or interpreter, and node 220 can also incorporate a serializer, so that data objects can be serialized and transmitted in both directions.

In overview, the serialization methodology of the present invention includes the following elements:

1. At the lowest level, the stream is serialized as a string of nibble-encoded integers. The sign bit of a four-bit nibble is used for indicating continuation in another nibble. The number of nibbles used for an integer varies based on its magnitude.
2. On top of item 1, the concept of a sentinel is introduced. The sentinel is the integer 0. To make the sentinel unambiguous, any integer other than a sentinel is encoded by first incrementing the number by one. The presence of a sentinel indicates that a nibble command value follows.
3. On top of item 2, begin and end commands are defined. The begin command is 0, and the end command is 1. These commands are preceded by the sentinel. These commands are used for grouping nibbles into groups or sets of numbers.
4. On top of item 3, an interpretation rule is defined as follows: Begin by interpreting the stream of integers as references to objects previously defined (either by definition, or by previous constructions in the stream). For each ascent or descent into or out of a group of numbers, toggle the stream interpretation state between reference and absolute. (An absolute stream contains the data body of an object.)
5. On top of item 4, "factories" and "recipes" are introduced. Serialized objects are each separated into data and a recipe. A factory can then construct the object by applying the recipe to the data.

These features are described in greater detail below, starting with item 1 and proceeding through item 5.

Nibble Encoding

For serialization (encoding), data object 201 is separated into its various components (e.g., primitive pieces and non-primitive pieces). Primitive pieces can be encoded as numbers (integers). Primitive pieces can be either fixed in length or variable in length. Fix-sized primitives are encoded as a single number. Variable-sized primitives are encoded as two numbers: one number to indicate its length, and the other number representing the content. Non-primitive pieces are separated into sub-pieces that ultimately can be represented using primitive pieces.

According to the present embodiment of the present invention, the integer numbers are encoded as one or more nibbles (a nibble has four bits). Smaller numbers are encoded using three of the bits in a single nibble. Larger numbers (those numbers requiring more than three bits for encoding) are encoded using more than one nibble. When a number is encoded using multiple nibbles, three of the bits in the nibble are used for a portion of the number, and the fourth bit (the sign bit or flag bit) is used to indicate that the encoded number continues into another nibble. In one embodiment, the sign bit is set equal to "0" (zero) to indicate that the instant nibble is the last nibble, and the sign bit is set equal to "1" (one) to indicate that the encoded number is continued into another nibble.

For example, the number "6" in binary is "110," and is encoded using a single four-bit nibble as "0110" (the left-most bit value of zero indicating that the encoded number is not continued into another nibble). The number "13" in binary is "1101," and is encoded using two four-bit nibbles as follows. The first nibble reads "1101," with the three right-most bits of the nibble ("101") representing the three right-most values of the binary "13," and the left-most bit of the nibble ("1") indicating that the encoded number continues into a second nibble. The second nibble reads "0001," with the right-most bit of the nibble ("1") being the left-most value of the binary "13," the left-most bit of the nibble ("0") indicating that the encoded number is not continued into a third nibble. In the second nibble, the two middle bits are not used (that is, they are set to zero). Larger numbers can be similarly represented by stringing together multiple nibbles.

It is possible to lengthen the encoding of a number by setting the sign bit to the continuation value (e.g., to one), and then adding a higher order zero nibble (that is, a nibble containing four zeroes). For example, it may be convenient to flush the byte stream, for example, to close a file or complete a packet for communication. A trailing byte that includes only a single nibble can be filled by adding a higher order zero nibble to the encoded number. In other words, if an encoded number consists of an odd number of nibbles (equal to some number of bytes plus one-half of a byte), it may be desirable to include a higher order zero nibble instead of having to transmit half of a byte.

For instance, the number "6" can be encoded as two nibbles instead of one nibble. In this case, in contrast to the example above, the first nibble would consist of "1110" (the left-most value of the nibble indicating that the encoding continues into a second nibble, the three right-most values representing the encoded "6"), and the second nibble would consist of "0000." However, lengthening the encoding is generally not done; that is, the shortest possible encoding is generally used.

Using the scheme above, numbers can be encoded and placed into a stream, one number abutting another but still distinguishable from each other by virtue of the sign or flag bit. The value of the sign or flag bit indicates when one encoded number ends and hence when the next one begins.

Begin and End Commands and Sentinels

A group or set of numbers is distinguished from another group of numbers as follows. According to the present embodiment of the present invention, nibbles are grouped using what are referred to herein as "commands." Specifically, the commands are referred to herein as a "begin" command, indicating the beginning of a group of nibbles, and as an "end" command, indicating the end of a group of nibbles. In essence, a pair of commands (e.g., a begin command and an end command) bracket a selected group of nibbles and, inherently, a set of numbers encoded as the group of nibbles.

In one embodiment, the begin command is the integer "0" and the end command is the integer "1." The begin command and the end command are each represented as a single nibble. To distinguish commands from other data in the stream, commands are immediately preceded by what is referred to herein as a "sentinel." The sentinel indicates that a command value immediately follows.

In one embodiment, the sentinel is the integer "0," represented as a single nibble. To make the sentinel unambiguous (that is, to distinguish the sentinel from the number zero in a data object), any integer other than the sentinel and the begin and end commands is incremented by a prescribed amount before encoding. In one embodiment, each integer is incremented by one before encoding. Thus, in the examples above, the number "6" is actually encoded as the number "7," and the number "13" is actually encoded as the number "14."

Thus, a set of numbers representing, for example, a data object can be segregated from another set of numbers by bracketing each set of numbers with a begin command and an end command. Such a scheme provides a number of advantages. One advantage is that the serializer 203 and the interpreter or deserializer 205 of FIG. 2 can be asymmetric. To illustrate this, consider an example in which data object 201 at node 210 includes three fields (e.g., name, address and phone number). Data object 201 is serialized and transmitted to deserializer 205, which expects to receive and construct a data object having three fields. Later in time, a fourth field (e.g., e-mail address) is added to the data object 201 at node 210. This data object is serialized and transmitted to deserializer 205, which is still expecting only three fields. According to the present embodiment of the present invention, upon reading three fields, deserializer 205 can skip any remaining fields in the stream, jump ahead to the end command, and proceed with reading the next set of numbers. According to one embodiment, information that is skipped can be handled in a manner that will be described further below (refer to the discussion of "factories" and "recipes").

In general, by using the begin and end commands to demarcate the beginning and end of a set of numbers, a serializer can add new data fields to a data stream, and a deserializer can skip those new fields if need be. Thus, according to the invention, information can be added to a data object or data stream and still handled by a legacy (e.g., older version) interpreter. The reverse situation also holds. For instance, if a deserializer is expecting four data fields but only receives three, then the deserializer can enter default values into the missing fields of information until an end command is received.

Interpretation of Reference and Absolute Objects

According to the present embodiment of the present invention, the begin and end commands, and hence the sets of numbers they bracket, can be nested. When nested, a particular begin command is associated in a pair with a particular end command. In this respect, the begin and end commands can be considered as similar to the use of parentheses in a mathematical expression. However, in contrast to the simple use of pairs of parentheses, the begin and end commands provide added functionality. One such function has already been described. Another such function pertains to the use of the begin and end commands to identify whether an encoded number or set of numbers represents an "absolute" object or a "reference" object.

An absolute object includes the encoded data body of a data object. That is, an absolute object includes actual encoded data for the data object, from which the interpreter can define or construct the data object. An absolute object generally refers to a data object not previously encountered in the data stream, and so an absolute object can also be referred to as a new object. A reference object is a reference to an object that has been previously serialized, defined or constructed. In essence, a reference is an identifier of or pointer to an object that has been previously encountered. When an absolute object is first serialized, it is assigned a reference number that can be used in subsequent encounters with that object in lieu of using the absolute object.

A data object may include both absolute elements and reference elements. That is, a data object may reference another data object, essentially incorporating the other data object by reference. To illustrate, consider an example in which a first data object includes a list of employees. A second data object for the company phone directory could incorporate the first data object by reference. The second data object could also include absolute encoded data with each employee's phone extension. Alternatively, each employee's phone extension might be provided by a third data object also referenced by the second data object. A referenced data object might include a reference to yet another data object.

In one embodiment, to identify whether an encoded number or set of numbers represents a reference or absolute object, the begin and end commands are counted. In one such embodiment, the count is performed by incrementing the count by one for each begin or end command encountered in the data stream. Alternatively, the count can be performed by increasing the count by one when a begin command is encountered, and decreasing the count by one when an end command is encountered. In either case, if the count is even, then the encoded numbers that follow in the data stream constitute an absolute or new object. If the count is odd, then the encoded numbers that follow in the data stream constitute a reference object.

In the present embodiment, commands can abut each other in the data stream. That is, two begin commands can be placed next to each other in the stream, without an intervening reference or absolute number (however, there would be an intervening sentinel; each command is preceded by the sentinel value). By placing commands next to each other in this manner, control is exerted over whether the encoded numbers that follow in the stream are defined as a reference or absolute. For example, recall that in one embodiment an odd count of begin and end commands is used to identify that the number that follows is a reference. If the count of commands is already odd, but the next encoded number is a reference, then two begin commands can be Inserted into the data stream to maintain an odd count and thereby identify the following number as a reference.

Alternative schemes for indicating whether a number or set of numbers is absolute or a reference can be used. For example, a unique reference command can be defined to indicate that a number that follows is a reference. A unique absolute command can be similarly defined and used instead to indicate that a number that follows is absolute. Alternatively, the context of the serializer and interpreter can be established such that they are always expecting either a reference or an absolute. In a context that expects references, an absolute is enclosed by the begin and end commands. In a context that expects absolutes, a reference is enclosed by begin and end commands.

Factories and Recipes

In one embodiment, the schemes described above also incorporate features in which a serialized data object is separated into data and what is referred to herein as a "recipe." A recipe is applied to the data to construct the data object. The recipe is applied to the data using what is referred to herein as a "factory."

A factory describes, for example, the fields of a data object. A recipe, for example, describes how the data in a data stream is used to fill those fields. The factory also describes, for example, how the fields are assembled into the data object. Generally speaking, factories and recipes provide instructions associated with constructing data objects from sets of numbers, and for entering the sets of numbers into the data objects so constructed. It is appreciated that the act of filling a data object can also constitute the act of making the object.

As previously described herein, on the first encounter with a data object, a reference number is assigned to that object. That reference number is encoded with the serialized object, and placed in the data stream between a pair of bracketing commands (e.g., between paired begin and end commands). In the present embodiment, upon that first encounter, the serializer inquires of the object the factory and recipe associated with that object. The factory and recipe, if not previously encountered (see below), are also serialized and placed into the data stream with the data object (e.g., between the paired begin and end commands).

In the present embodiment, upon a first encounter with a particular factory, the factory is assigned a reference number. Upon a first encounter with a particular recipe, the recipe is also assigned a reference number. The reference numbers can be used in subsequent encounters with that factory and with that recipe, in lieu of serializing the absolute factory and the absolute recipe.

In a manner similar to that previously described for data objects, factories and recipes may include both absolute elements and reference elements. Also, a factory or a recipe can reference other factories or recipes, respectively. Moreover, referenced factories and recipes can reference other factories and recipes, respectively. In the present embodiment, there is at least one factory (a root factory) that is known to both the encoder and decoder. This root factory is assigned a known reference number (e.g., reference number 1).

There is a hierarchy to the numbers in the serialized data stream. In one embodiment, for a new data object, first there is a reference number, followed by the definition of a factory which is followed by a recipe, then by the numbers that constitute the data object values. Each element in the hierarchy may be a reference or an absolute. A reference may be made to another reference.

There was discussion above about how a serializer can add new data fields to a data stream, and a deserializer can skip those new fields if need be, so that the serializer and deserializer could be asymmetric. In the alternative, through the use of factories and recipes, data objects with the appropriate number of fields can be constructed by the deserializer, thus obviating the need to skip fields. In essence, a data object carries with it the instructions for constructing a data object, and instructions for entering information into the data object.

Serialization and Interpretation Methods

Figure 3:
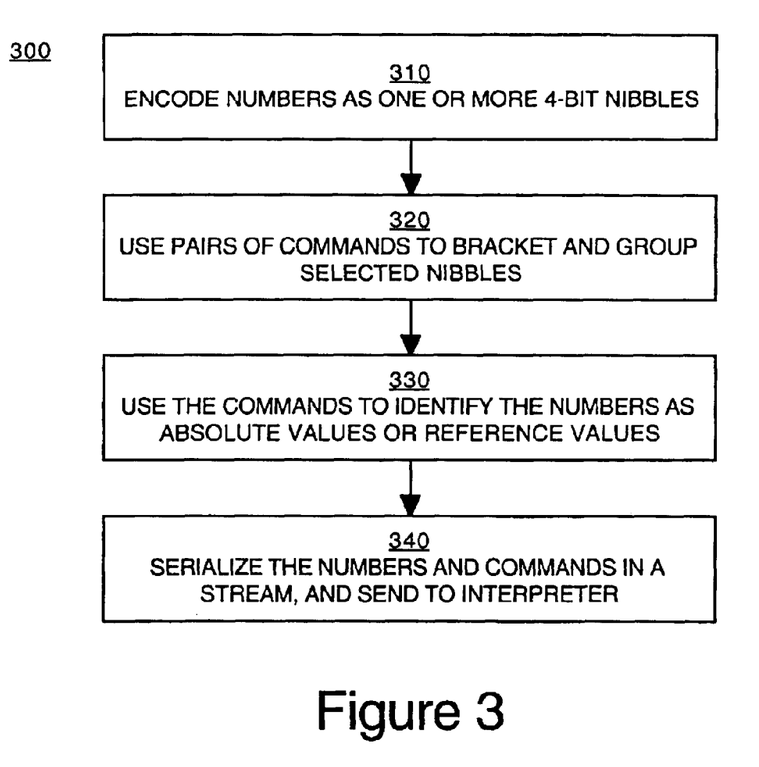
FIG. 3 is a flowchart of a computer-implemented method for serializing data in accordance with one embodiment of the present invention.
Figure 4:
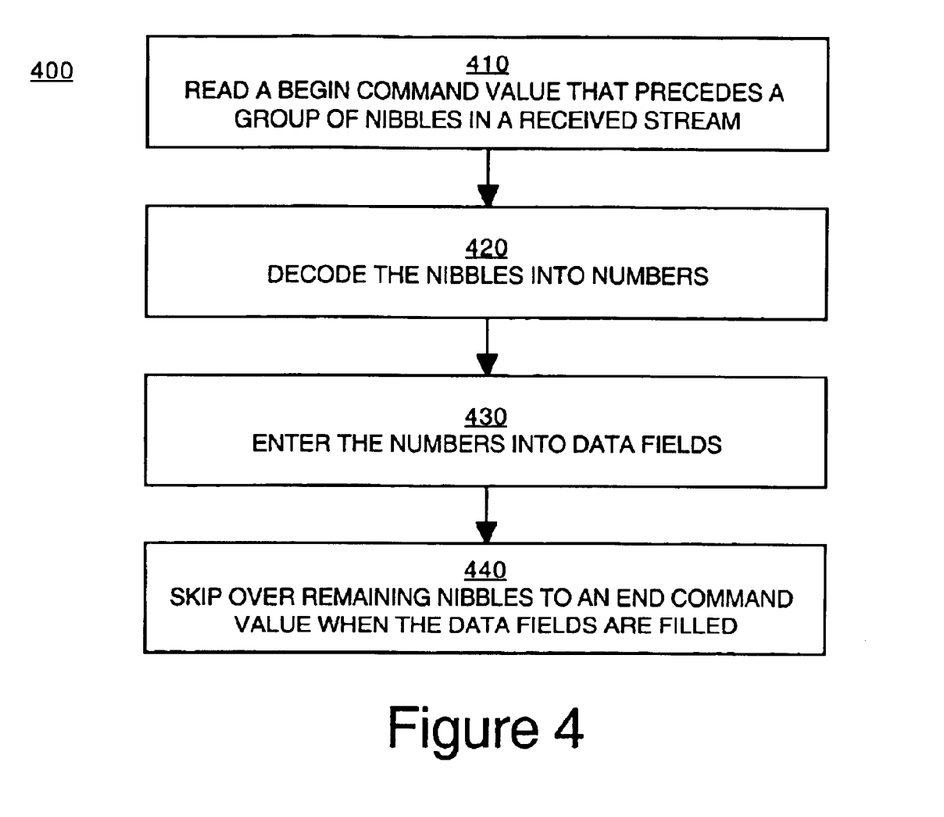
FIG. 4 is a flowchart of a computer-implemented method for interpreting serialized data in accordance with one embodiment of the present invention.

FIG. 3 is a flowchart 300 of a method for serializing data in accordance with one embodiment of the present invention. FIG. 4 is a flowchart 400 of a method for interpreting serialized data in accordance with one embodiment of the present invention. Although specific steps are disclosed in flowcharts 300 and 400, such steps are exemplary. That is, embodiments of the present invention are well suited to performing various other steps or variations of the steps recited in flowcharts 300 and 400. It is appreciated that the steps in flowcharts 300 and 400 may be performed in an order different than presented, and that not all of the steps in flowcharts 300 and 400 may be performed. All of, or a portion of, the methods described by flowcharts 300 and 400 can be implemented using computer-readable and computer-executable instructions which reside, for example, in computer-usable media of a computer system or like device (e.g., devices 100 and 120 of FIGS. 1A and 1B, respectively).

With reference first to step 310 of FIG. 3, numbers are each encoded as one or more four-bit nibbles. Three bits of a nibble are for encoding some portion of a number and one bit of the nibble is for indicating whether encoding of the number is continued to another nibble.

In step 320, a begin command and an end command are used to bracket and thereby group selected nibbles. The numbers and the commands are serialized in a stream. In one embodiment, a command is marked with (e.g., preceded by) a sentinel value. In one such embodiment, the sentinel value is zero. To distinguish a number zero from the sentinel value, each number to be encoded is incremented by a prescribed amount (e.g., by one) prior to encoding.

In one embodiment, on the first occurrence of a data object, a reference number is associated with the object. Each subsequent occurrence of the object in the stream can then use the reference number.

In one such embodiment, in step 330 of FIG. 3, the reference number is distinguished as such by observing the number of occurrences in the stream of the begin and end commands. For example, if actual data for the data object is included in the stream, then the data is preceded by a single begin command. If the reference number is used instead of the actual data, then two begin commands are used. Begin and end commands can be nested, so in the example, a reference number is used when the count is even and actual data is used when the count is odd.

In step 340, the numbers and commands are serialized in a stream and sent to an interpreter. In one embodiment, the stream also includes instructions associated with constructing the object from the numbers in the serialized stream. In one such embodiment, a reference number is associated with the instructions, wherein a subsequent occurrence of the instructions in the stream uses the reference number.

With reference first to step 410 of FIG. 4, a data stream is received. A begin value that precedes a group of nibbles is read. The group followed by an end value that indicates when the group ends.

In step 420, the nibbles are decoded into a set of numbers that constitute a data object, wherein three bits of each nibble represents some portion of a number and wherein a fourth bit of each nibble indicates whether any remaining portion of the number is continued into another nibble. In one embodiment, a reference number is associated with the set of numbers and thus with the data object. Subsequent occurrences of the data object in the stream use the reference number in lieu of the set of numbers. In one such embodiment, a count of begin values and of end values is maintained. The count is used to determine whether the reference number is being used in lieu of the set of numbers.

In step 430, the first set of numbers are entered into data fields to construct the data object.

In step 440, any nibbles remaining to the end value are skipped when the data fields are filled.

In summary, the embodiments of the present invention provide methods and devices that allow forward and backward versioning of both a data serializer and an interpreter. Objects can be separated into data and instructions for constructing the object from the data. Previously defined or constructed objects can be represented using a reference number. Instructions can also be referenced. Accordingly, repetition of information in the serialized data stream can be reduced or eliminated.

The preferred embodiments of the present invention, methods and devices for binary object serialization, are thus described. While the present invention has been described in particular embodiments, it should be appreciated that the present invention should not be construed as limited by such embodiments, but rather construed according to the below claims.

What is claimed is:

1. A data serialization method comprising:
    encoding a number as one or more four-bit nibbles, wherein three bits of a nibble are for encoding said number and one bit of said nibble is for indicating whether encoding of said number is continued to another nibble;

using pairs of commands to bracket selected nibbles, wherein a first command is for indicating when a group of selected nibbles begins and a second command is for indicating when said group ends;

marking each of said commands with respective sentinel values, said sentinel values each indicating a command follows thereafter; and serializing said number and said commands in a stream.

2. The data serialization method of claim 1 wherein said sentinel value is zero and wherein said number is incremented by a prescribed amount prior to encoding such that the number zero is distinguishable from said sentinel value.

3. The data serialization method of claim 1 wherein an object comprising a grouping of data is serialized as a first set of numbers, each of said numbers encoded as one or more nibbles, said first set of numbers bracketed by a pair of first and second commands.

4. The data serialization method of claim 3 further comprising associating a reference number with said object, wherein a subsequent occurrence of said object in said stream uses said reference number in lieu of said first set of numbers.

5. The data serialization method of claim 4 further comprising distinguishing said reference number from said first set of numbers by observing the number of occurrences in said stream of said first and second commands.

6. The data serialization method of claim 3 wherein said stream further comprises instructions associated with constructing said object from said set of numbers, said instructions serialized as a second set of numbers bracketed by a pair of first and second commands.

7. The data serialization method of claim 6 further comprising associating a reference number with said instructions, wherein a subsequent occurrence of said instructions in said stream uses said reference number in lieu of said second set of numbers.

8. The data serialization method of claim 3 wherein said stream further comprises instructions for entering said first set of numbers into data fields of said object.

9. The data serialization method of claim 3 further comprising an interpreter of said stream reading said first set of numbers into data fields of said object starting at said first command and automatically skipping to said second command when said data fields are filled.

10. A method of interpreting serialized data received in a stream, said method comprising:

reading a begin value that precedes a group of nibbles, said group followed by an end value that indicates when said group ends;

decoding said nibbles into a first set of numbers that constitute a data object, wherein three bits of each nibble represents some portion of a number and wherein a fourth bit of each nibble indicates whether any remaining portion of said number is continued into another nibble;

entering said first set of numbers into data fields to construct said data object; and skipping over any remaining nibbles to said end value when said data fields are filled.

11. The method of claim 10 wherein said begin and end values are each preceded with a sentinel value that marks said begin and end values.

12. The method of claim 11 wherein said sentinel value is zero and wherein said numbers are each incremented by a prescribed amount prior to encoding such that the number zero is distinguishable from said sentinel value.

13. The method of claim 10 wherein a reference number is associated with said first set of numbers and thus with said data object, wherein subsequent occurrences of said data object in said stream comprise said reference number in lieu of said first set of numbers.

14. The method of claim 13 further comprising maintaining a count of begin values and of end values to determine whether said reference number is being used in lieu of said first set of numbers.

15. The method of claim 10 wherein said stream further comprises instructions associated with constructing said data object.

16. The method of claim 10 wherein said stream further comprises instructions for entering said first set of numbers into said data fields.

17. A computer system comprising:

a bus;

a processor coupled to said bus; and a memory coupled to said bus, said memory comprising instructions for implementing a method of serializing data, said method comprising:

encoding a number as one or more four-bit nibbles, wherein three bits of a nibble are for encoding said number and one bit of said nibble is for indicating whether encoding of said number is continued to another nibble;

using pairs of commands to bracket selected nibbles, wherein a first command is for indicating when a group of selected nibbles begins and a second command is for indicating when said group ends; and serializing said number and said commands in a stream.

18. The computer system of claim 17 wherein said method further comprises marking a command with a sentinel value, said sentinel value for indicating said command follows thereafter.

19. The computer system of claim 18 wherein said sentinel value is zero and wherein said number is incremented by a prescribed amount prior to encoding such that the number zero is distinguishable from said sentinel value.

20. The computer system of claim 17 wherein an object comprising a grouping of data is serialized as a first set of numbers, each of said numbers encoded as one or more nibbles, said first set of numbers bracketed by a pair of first and second commands.

21. The computer system of claim 20 wherein said method further comprises associating a reference number with said object and wherein a subsequent occurrence of said object in said stream uses said reference number in lieu of said first set of numbers.

22. The computer system of claim 21 wherein said method further comprises distinguishing said reference number from said first set of numbers by observing the number of occurrences in said stream of said first and second commands.

23. The computer system of claim 20 wherein said stream further comprises instructions associated with constructing said object from said set of numbers, said instructions serialized as a second set of numbers bracketed by a pair of first and second commands.

24. The computer system of claim 23 wherein said method further comprises associating a reference number with said instructions, wherein a subsequent occurrence of said instructions in said stream uses said reference number in lieu of said second set of numbers.

25. The computer system of claim 20 wherein said stream further comprises instructions for entering said first set of numbers into data fields of said object.

26. The computer system of claim 20 wherein said method further comprises an interpreter of said stream reading said first set of numbers into data fields of said object starting at said first command, wherein said interpreter automatically skips to said second command when said data fields are filled.

* * * * *